US007016938B1

(12) United States Patent
Quine

(10) Patent No.: US 7,016,938 B1
(45) Date of Patent: Mar. 21, 2006

(54) E-MAIL FORWARDING SYSTEM HAVING ARCHIVAL DATABASE

(75) Inventor: Douglas B Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 933 days.

(21) Appl. No.: 09/629,904

(22) Filed: Jul. 31, 2000

(51) Int. Cl.
G06F 15/16 (2006.01)

(52) U.S. Cl. .................. 709/206; 709/206; 709/204

(58) Field of Classification Search ............... 709/206, 709/207, 225; 379/88.17
See application file for complete search history.

(56) References Cited

U.S. PATENT DOCUMENTS

| 5,805,810 | A | * | 9/1998 | Maxwell | |
|---|---|---|---|---|---|
| 5,844,969 | A | | 12/1998 | Goldman et al. | 379/93.24 |
| 5,978,837 | A | | 11/1999 | Foladare et al. | 709/207 |
| 5,987,508 | A | | 11/1999 | Agraharam et al. | 358/402 |
| 6,035,327 | A | | 3/2000 | Buckley et al. | 709/206 |
| 6,049,291 | A | | 4/2000 | Kikinis | 340/825.44 |
| 6,055,302 | A | | 4/2000 | Schmersel et al. | 379/207 |
| 6,075,844 | A | * | 6/2000 | Goldberg et al. | 379/88.17 |
| 6,088,720 | A | | 7/2000 | Berkowitz et al. | 709/206 |
| 6,092,114 | A | | 7/2000 | Shaffer et al. | 709/232 |
| 6,118,856 | A | | 9/2000 | Paarsmarkt et al. | 379/93.24 |
| 6,128,739 | A | | 10/2000 | Fleming, III | 713/200 |
| 6,138,146 | A | | 10/2000 | Moon et al. | 709/206 |
| 6,157,945 | A | | 12/2000 | Balma et al. | 709/206 |
| 6,161,129 | A | | 12/2000 | Rochkind | 709/206 |
| 6,389,455 | B1 | * | 5/2002 | Fuisz | 709/206 |
| 6,405,243 | B1 | * | 6/2002 | Nielsen | |
| 6,427,164 | B1 | | 7/2002 | Reilly | 709/206 |
| 6,437,806 | B1 | | 8/2002 | Iwasa | 345/764 |
| 6,438,583 | B1 | * | 8/2002 | McDowell et al. | |

OTHER PUBLICATIONS

E Veripost, "Search Results", 5 pages, Aug. 15, 2001.
E Veripost, "Changed Your E-mail Address", 3 pages Aug. 20, 2001.
E Veripost, "Keep in Touch After Gruadation with Veripost", 2 pages, Apr. 30, 2001.
E Veripost, "Have you Changed your E-mail Address", 12 pages, Mar. 30, 2001.
Computermail.net, www.email addresses.com, "Free Email Address Directory", May 10, 2001.

(Continued)

Primary Examiner—Rupal Dharia
Assistant Examiner—Djenane M. Bayard
(74) Attorney, Agent, or Firm—Christopher J. Capelli; George M. Macdonald; Angelo N. Chaclas

(57) ABSTRACT

A method for forwarding an e-mail message from a disfavored e-mail address to a forwarding e-mail address via a remote e-mail forwarding computer having a unique e-mail address. An e-mail message is sent from a user to the remote e-mail forwarding computer. The remote e-mail forwarding computer parses the intended e-mail address from the e-mail message to determine if there is a disfavored e-mail address associated with the intended e-mail address. The e-mail message is sent from the remote computer to a computer associated with at least one forwarding address if there is determined at least one disfavored e-mail address is associated with the intended e-mail address. If there is not a determined forwarding e-mail address than the remote computer stores at least the disfavored e-mail in archival for forwarding in the event a forwarding address is subsequently stored in the remote computer which is associated with the disfavored e-mail address.

15 Claims, 7 Drawing Sheets

OTHER PUBLICATIONS

Computermail.net, www.emailaddress.com, "Finding Email Address", May 10, 2001.
Computermail.net, www.emailaddress.com, "Large Email Directories", May 10, 2001.
IMarketing News, iMarketingNews.com/news/article, Jupiter Retailing Forum, ActiveNames Is Latest Victim of Economic Slowdown, May 21-22, Chicago.
ActiveNames™, www.activenames.com, "About Us", Jan. 10, 2001, 24 pages.
Re-route.com, www.re-route.com, Re-route E-mail Forwarding Service, Mar. 12, 2001, 19 pages.
Wall Street Journal, Market Place, E-World, "Many Internet Users Find Themselves Stuck at Their Old Address", by Julia Angwin, Aug. 28, 2000.
Internet Solutions, "Email for Life", "Here's how to keep the same e-mail address through all of life's changes", Sheryl Canter, PC Magazine, Mar. 21, 2000.
The Washington Post, Business, "The Download, The address you leave behind", Shannon Henry, Mar. 15, 2001.
Return Path, "Purelist™ and email list optimization service".
Return Path, "ECOA™ and email change-of-address service".
Return Path, "Seven Techniques to Improve Email List Integrity", Tim Dolan, May 18, 2001.
Opt-innews™, "Return Path Grows To 90 Million Signing Brooks Brothers, Radisson & Publishers Clearinghouse", May 17, 2001.
ReturnPath, "About Us", Nov. 27, 2001, 11 pages.
ReturnPath, "ECOA Email Change-of-Address".
ReturnPath, ECOA and PureList™, May 17, 2001, 15 pages.
ReturnPath, "SmartBounce™", What is SmartBounce?, Jan. 10, 2001, 7 pages.
Two (2) webpages from www.switchemail.com website printed Nov. 1, 2002.

* cited by examiner

| Disfavored E-Mail Address | Forwarding E-mail Address |
|---|---|
| Doug@yahoo.com<br>Doug@hotmail.com<br>Doug@obsolete.com | Doug@current.com |
| Doug@obsolete.com | Doug@work.com<br>Doug@home.com<br>Doug@wireless.com |
| Doug@yahoo.com<br>Doug@hotmail.com<br>Doug@obsolete.com | Doug@work.com<br>Doug@home.com<br>Doug@wireless.com |

E-MAIL FORWARDING SYSTEM HAVING ARCHIVAL DATABASE

FIELD OF THE INVENTION

The present invention relates to a system and method for forwarding electronic e-mail messages, and more particularly, relates to a system and method which archives requests for forwarding e-mail messages from undeliverable e-mail addresses and checks each new subscriber and address registration to determine if there is a forwarding e-mail address available for the previous undeliverable e-mail message.

BACKGROUND OF THE INVENTION

Recent advances in telecommunications networks have drastically altered the manner in which people interact and conduct business. These advances promote efficiency and convenience in one's ability to receive important information. With this in mind, individuals and businesses today find that their physical and electronic addresses are changing faster than ever with increased mobility and competing message delivery services. Deregulation and privatization of the global postal systems, competing package delivery services, and rapid growth of multiple competing electronic mail (e-mail) systems are creating an environment in which there is no single point of contact for address correction as there was when the sole messaging provider was the national postal service.

Users who enjoy the benefit of sending and receiving e-mail messages typically subscribe to an Internet Service Provider (ISP) offering such e-mail capabilities (e.g., America Online (AOL), Netcom, and Redconnect) and/or may subscribe to an internet based e-mail service (e.g., juno, rocketmail, yahoo) which each is associated with a particular e-mail address. Thus, the e-mail address is unique to the e-mail service provider. The uniqueness of an address to a selected provider is often apparent on the face of the address, e.g., DQuine@aol.com, Quine@juno.com or DouglasQuine@yahoo.com. A user or subscriber to a particular e-mail service may from time to time desire or need to change service providers (e.g., from DQuine@aol.com to QuineDo@pb.com). Exemplary motivation for these changes may derive from the fact that an alternative service provider charges lower rates, or the existing provider's inability to upgrade its service.

A user who desires to change from one e-mail service provider to another suddenly faces the reality of being bound to the old service provider because the user's address is unique to that one provider. A sudden and complete changeover is in many circumstances impossible because the community of people who wish to send electronic messages to the user are only aware that the old address exists. For example, an e-mail address may be published in an industry directory that is only published once every year or two years. Alternatively, the e-mail address may be printed on a business card which cannot be retracted and corrected. Thus, the user incurs a potentially significant loss of prospective business by abandoning the old address.

Currently, there is no effective means in place for address correction of e-mail addresses. Even if the e-mail sender is highly diligent, there are no resources or processes available to identify corrected electronic address information. The problem is further accentuated by the fact that extreme competition in internet service providers, and likewise e-mail service providers, results in extremely high obsolesce of e-mail addresses with no means for e-mail forwarding (e.g., closing an AOL e-mail account provides no option for forwarding e-mail intended for that account to a new e-mail address).

Further, today's web savvy users may have multiple e-mail addresses which periodically change as new features develop or are lost. Entire domain names can be lost (e.g., lostdomain.com) and all mail directed there may be lost as well. In either case, typically the MAIL DAEMON message is returned to the sender, notifying the sender that the e-mail address cannot be found and e-mail message is being returned to the sender.

Some service providers offer their user-subscribers the option of a message forwarding service. These forwarding services operate by receiving the incoming message, retrieving the portion of the incoming message that identifies a selected user who subscribes to the forwarding service, associating the selected user with a forwarding address through the use of a lookup table, and transmitting the message to the forwarding address. The forwarding services differ from the normal message delivery service that the central service provider offers because a portion of the forwarding address belongs to another central service provider. Thus, the forwarded message is actually delivered to its intended recipient by the other or second service provider, i.e., the forwarded message passes through two central service providers, as opposed to just one provider. The intended message recipient is free to change the second provider with regularity provided that the recipient always informs the forwarding service of each change in the second provider. However, this message forwarding system only works with viable e-mail address, that is, the e-mail address associated with the first service provider must still be active and not obsolete. In fact, few e-mail services offer forwarding services and few, if any, offer to forward e-mail after the account is closed. Otherwise, the first service provider is only enabled to send the later mentioned MAIL DAEMON message back to the original sender of the -e-mail message.

SUMMARY OF THE INVENTION

Accordingly, the present invention relates to a method and system for forwarding an e-mail message intended to be delivered to an intended e-mail address to a remote forwarding e-mail computer in the event the e-mail address is disfavored. The remote e-mail forwarding computer is located at a unique e-mail address that is programmable to associate disfavored e-mail addresses with forwarding e-mail addresses.

In use a subscriber of the remote e-mail forwarding computer prescribes at least one disfavored e-mail address and at least one forwarding e-mail address in the remote e-mail forwarding computer. A user of the e-mail forwarding service then sends the e-mail message to the remote e-mail forwarding computer when the intended address is disfavored.

Upon receipt of the e-mail message at the remote e-mail forwarding computer, the e-mail forwarding computer parses the intended e-mail address from the e-mail message to determine if there is a disfavored e-mail address associated with the intended e-mail address. The parsing of the e-mail message includes the step of comparing the intended e-mail address to a look-up table to determine if the intended e-mail address is included as a disfavored e-mail address in the look-up table. If there is a match, the remote e-mail forwarding computer sends the e-mail message from the remote computer to a computer associated with at least one forwarding address if there is determined at least one disfavored e-mail address associated with the intended e-mail address.

If there is not a match, the remote computer preferably stores in an archival database at least the disfavored e-mail address if it is determined that there is no forwarding e-mail address associated with the disfavored e-mail address wherein the remote computer subsequently checks after each new subscriber registration and address registration if a forwarding address has been stored in the remote computer, which forwarding e-mail address is associated with the stored disfavored e-mail address. If there is such a match, the remote computer than sends at least a message to the forwarding address that a sender at a sender's e-mail address attempted to send an e-mail message to the disfavored e-mail address associated with the e-mail forwarding address.

DETAILED DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which:

FIG. 6 depicts a look-up table having dynamic parameters in accordance with the present invention.

DETAILED DESCRIPTION OF THE
PREFERRED EMBODIMENTS

Figure 1:
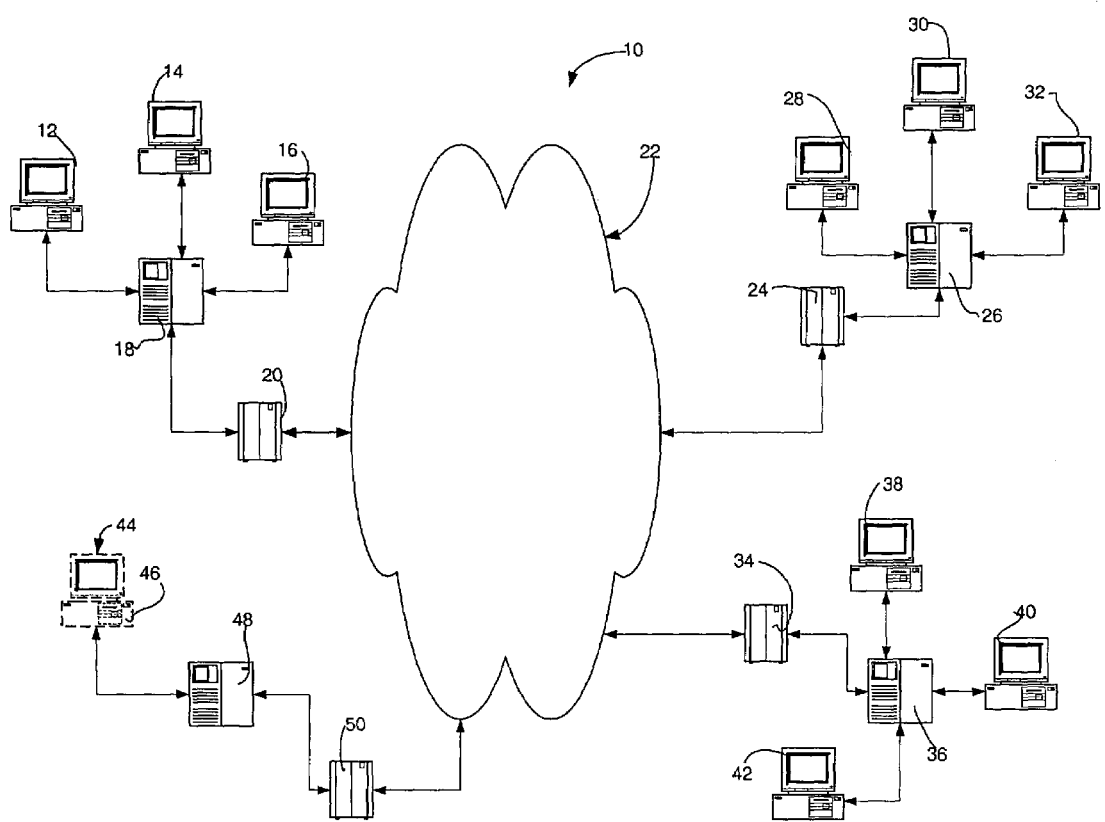
FIG. 1 depicts an electronic e-mail messaging system embodying the present invention.

FIG. 1 schematically depicts a conventional INTERNET telecommunications system 10. The FIG. 1 system is exemplary in nature. The present invention can be implemented as program control features on substantially all telecommunications service provider systems, and system 10 is intended to represent any operable telecommunications system that is used by any telecommunications service provider in conducting communication operations (e.g., facsimile, pager, mobile phone and PDA computers).

It is to be appreciated that the term "INTERNET" is well known in the art as designating a specific global international computer network that operates according to the TCP-IP protocol. A portion of the INTERNET receives or has in the past received funding from various United States governmental agencies including ARPA, NSF, NASA, and DOE. INTERNET communications protocols are promulgated by the Internet Engineering Task Force, according to standards that are currently set forth in RFC 1602.

Telecommunications system 10 includes a plurality of user or signal origination sites 12, 14 and 16, with each site being depicted in reference to a PC capable of generating and transmitting e-mail messages, wherein each site 12, 14 and 16 corresponds to a specific telecommunications address. A user may utilize one site or a plurality of sites. A single city or local service area may have millions of these signal origination sites. Each site 12, 14 and 16 corresponds to a telecommunication address that belongs to an individual, business, and other entity having need to avail themselves of telecommunications services.

It is to be understood that preferably each origination site 12, 14 and 16 feeds its signal (addressed to a subscriber identified at a selected service provider) to an internet service provider 18 (ISP), which in turn preferably feeds the signal to a local router node 20 that directs the local signal to a relay system, e.g., the INTERNET cloud 22, which transmits the signal to a router 24 through a series of relays. The signal eventually arrives at an internet service provider 26 through router 24.

As can be seen in FIG. 1, a plurality of destination sites 28, 30, 32, 38, 40 and 42 are shown connected to internet service providers 26 and 36 with each site being depicted in reference to a PC capable of generating and transmitting e-mail messages, wherein each site corresponds to a specific telecommunications address. It is of course to be appreciated that telecommunications system 10 includes a plurality of routers (e.g., routers 24 and 34 with each internet service provider being connected to a plurality of user sites (e.g., PC's 38, 40 and 42).

In accordance with the present invention, telecommunications system 10 additional includes a messaging forwarding system 44, which as will be further discussed below, enables e-mail messages to be automatically forwarded to a forwarding address, which forwarding address is associated with a currently undeliverable e-mail address. Messaging forwarding system 44 preferably includes a PC 46 connected to an internet service provider 48, which PC 46 is provided with a unique e-mail address (corrections@emailangel.com) and software programmed to perform the below described steps necessary to operate the present invention e-mail forwarding system 44. Internet service provider 48 is preferably connected to INTERNET 22 via router 50.

Figure 4:
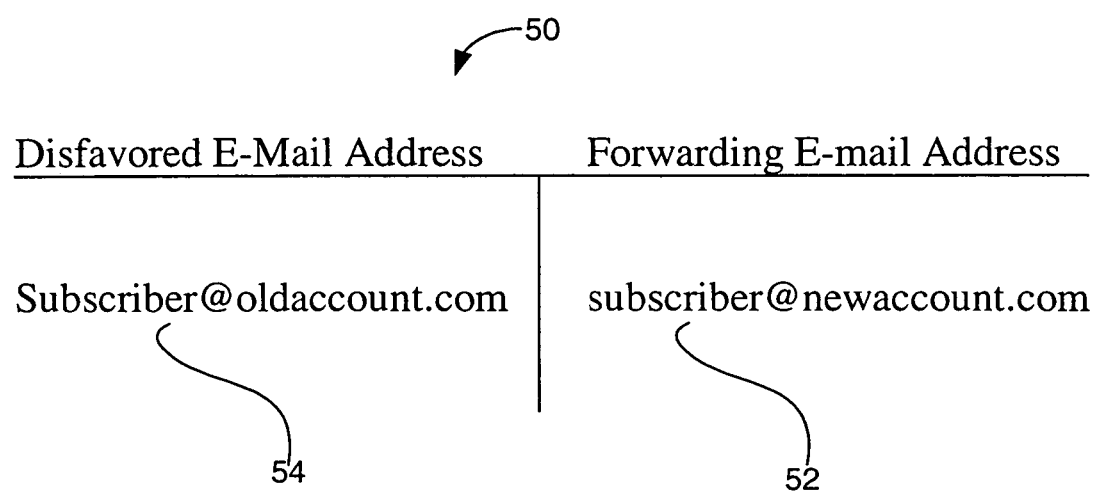
FIG. 4 depicts a look-up table used by the present invention.

As shown in FIG. 4, system 44 includes a software program that includes a look-up table 50, which is programmable by users to provide an e-mail forwarding address 52 associated with pre-programmed defunct (undeliverable) e-mail address[es] 54. It is to be appreciated that users of the present invention e-mail forwarding system 44 may access and program the look-up table 50 of system 44 through any conventional known means, including via the internet 22 in which a user at PC site 28 accesses the look-up table 50 in system 44, via the internet 22, via routers 24 and 50, and internet service providers 26 and 48. Look-up table 50 may include a plurality of defunct subscriber addresses (56+N), with each defunct address being associated with one or more forwarding addresses (58+M).

It is to be appreciated that in this description of the present invention system 44, mention is made to both a "user" and "subscriber" of system 44. It is to be understood that a "user" of system 44 refers to anyone who is capable of transmitting an e-mail message and accesses system 44 when it is desired to forward the message to a forwarding address, which forwarding address the sender is unaware of. A "subscriber" of system 44 refers to anyone who subscribes to the e-mail forwarding service of system 44 in which the subscriber registers both a defunct e-mail address 54 and at least one e-mail forwarding address 52 with system 44. And of course e-mail forwarding system 44 is accessible by any user.

In illustration, if a subscriber of system 44 closes an e-mail account (e.g., user@oldaccount.com) for what ever reason, the subscriber may however still desire to continue to receive messages sent to that address (e.g., user@oldaccount.com), but now wants to receive those messages at a different account (e.g., subscriber@newaccount.com). In the prior art, to accomplish this the subscriber had to resort to informing everyone who had the old e-mail address (e.g., user@oldaccount.com) of the new e-mail address (e.g., subscriber@newaccount.com). In accordance with the present invention, the subscriber now merely accesses the subscriber's designated account in system 44, via any known means such as the internet, registers the defunct e-mail address (e.g., user@oldaccount.com) and associates it with a desired forwarding e-mail address (e.g., subscriber@newaccount.com). Thus when a sender of an e-mail desires to transmit a message to a subscriber of system 44 but only knows the subscribers old e-mail address (e.g., user@oldaccount.com), which account is no longer active, the user now merely looks to system 44 to forward the message to an active account (e.g., subscriber@newaccount.com), as will be discussed further below.

As indicated above, FIG. 1 is exemplary in nature, and those skilled in the art understand that equivalent substitutions of system components can be made. For example, electrical communications over conductive telephone lines, optical communications over optical fibers, radio communications, and microwave communications are substantially equivalent for purposes of the invention. Likewise, messages could be relayed through e-mail, facsimile, pager, PDA device or other capable communications system.

Figure 2:
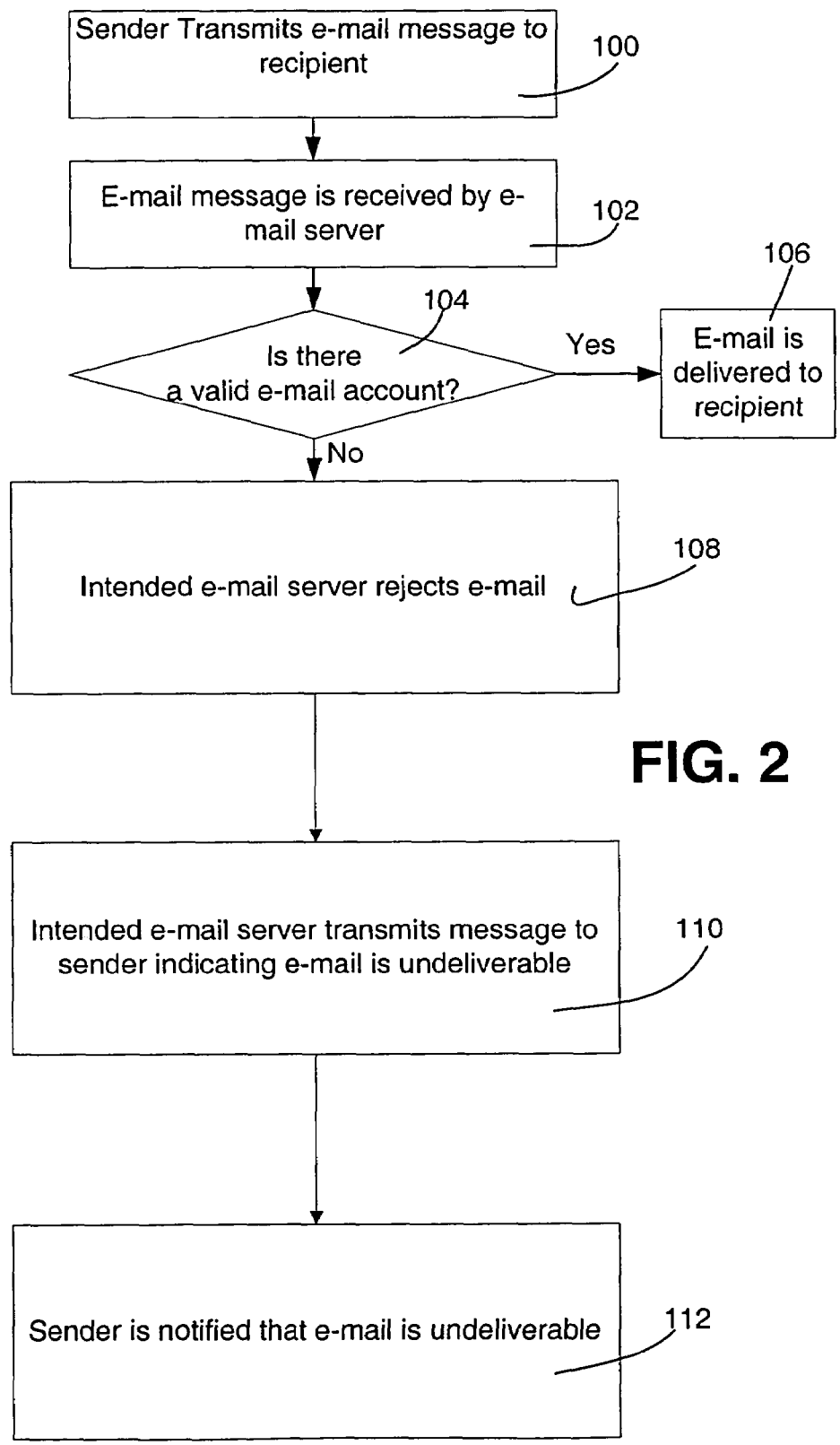
FIGS. 2 and 3 depict flowcharts depicting the operation of the present invention.
Figure 3:
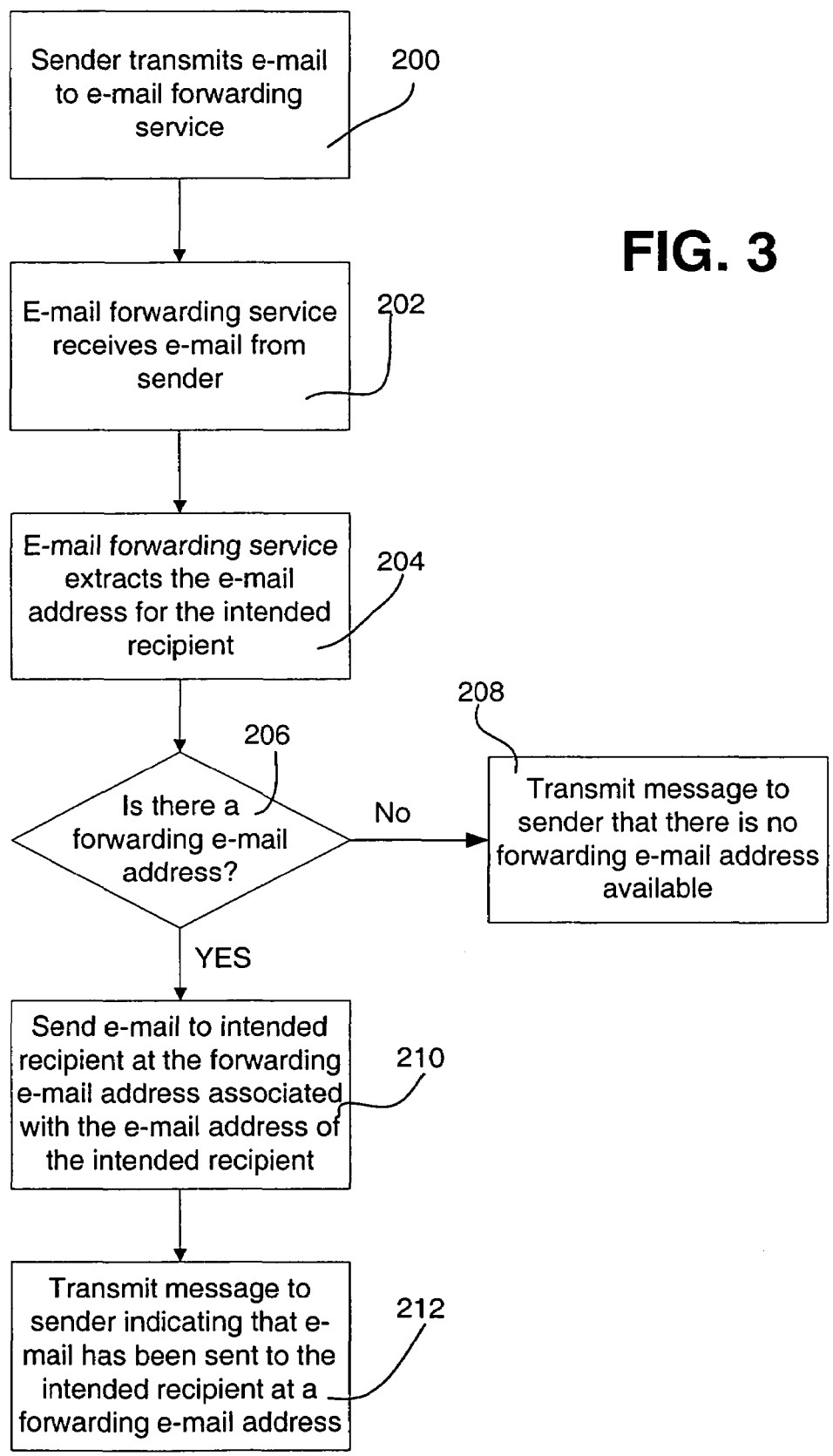
Figure 5A:
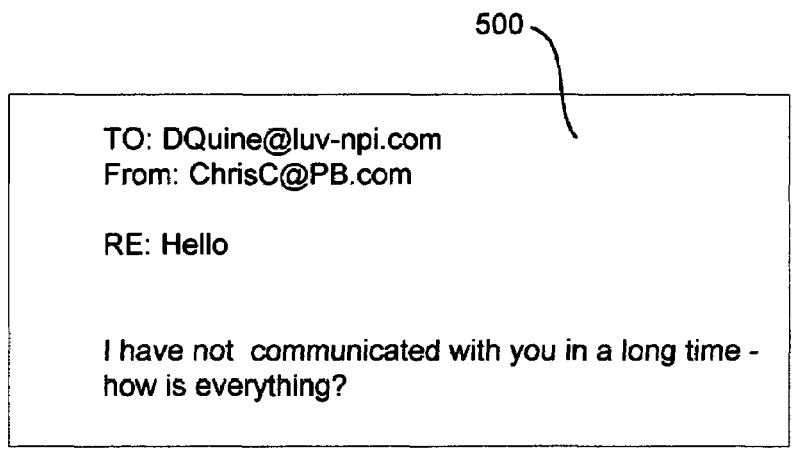
FIGS. 5A and 5B depict e-mail messages illustrating the operability of the e-mail messaging system of FIG. 1.
Figure 5B:
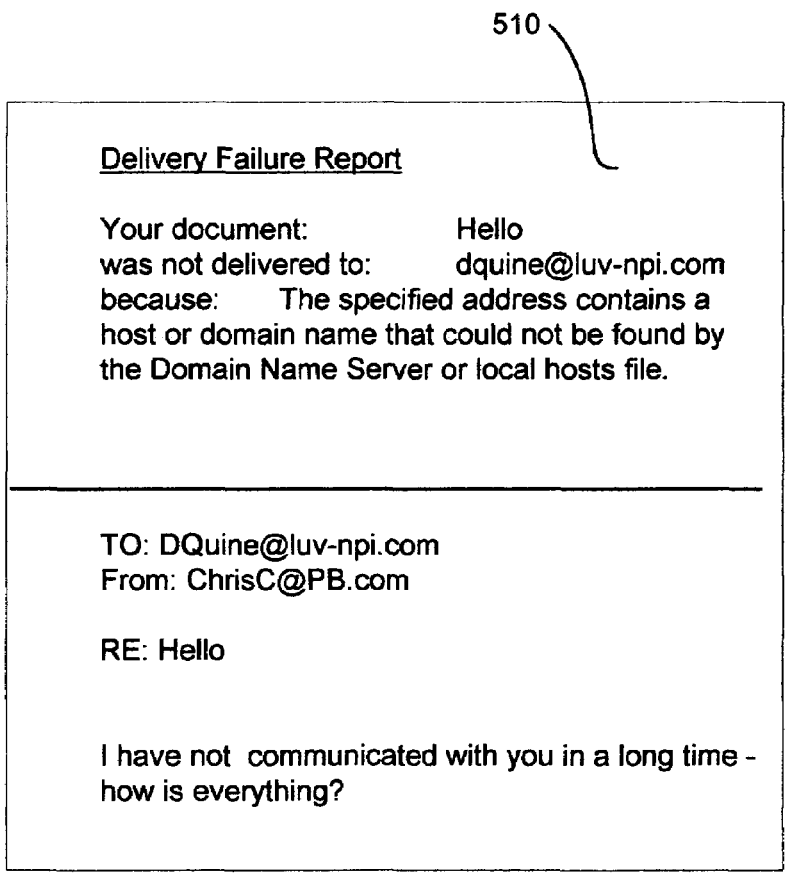

The method of use of system 44 will now be described with reference to FIGS. 2, 3 and 5 in conjunction with FIG. 1. Referring now to FIG. 2, when an email sender 14 desires to transmit a message to a recipient 30 having a known e-mail address (e.g., quine@luv-npi.com) of the recipient, the sender 14 transmits the e-mail message 500 (FIG. 5a) through conventional e-mail protocol, whereby the message is delivered to the identified mail server 26 (e.g., luv-npi) of the recipient 30, via the senders ISP server 18 (step 100). The recipient's 30 mail server 26 then receives the e-mail message (step 102), and if the e-mail account is valid (e.g., quine@luv-npi.com) (step 104), the e-mail message is then accessible to the view and thus considered delivered (step 106). If the account is not a valid account (e.g., quine@luv-npi.com) then the identified e-mail server 26 (e.g., luv-npi) rejects the request (step 108) and sends a MAIL-DAEMON message 510 (FIG. 5b) to the senders 14 e-mail server 18 indicating that the message is not deliverable (step 110). The sender's e-mail server 18 then sends a message to the sender 14 that the attached e-mail message is undeliverable.

Since the sender 14 cannot contact the recipient (e.g., quine) via the now defunct e-mail address 54 (e.g., quine@luv-npi.com), the sender 14 is presented with the problem of how to contact the recipient. In order to overcome this problem, the present invention e-mail forwarding system 44 provides a solution by forwarding the e-mail message to a new address so long as the recipient 30 (e.g., quine) subscribes to the forwarding service of the system 44. In the current illustrative example, the recipient (e.g., quine) registers the defunct e-mail address 54 (e.g., quine@luv-npi.com) with the system 44 and instructs the system to forward all messages to a specified forwarding e-mail address 52 (e.g., quine@docsense.com), as depicted in the look-up table of FIG. 4.

Returning now to the sender's 14 situation in which the sender 14 still desires to transmit the e-mail message 500 but does not know the correct e-mail address. In accordance with the present invention, the sender 14 now forwards the entire message 510 that was previously sent to the intended recipient's defunct e-mail address (e.g., quine@luv-npi.com), and rejected, to the e-mail address (e.g., corrections@emailangel.com) assigned to the e-mail forwarding system 44 (step 200). The e-mail server 48 (e.g., e-mailangel.com) that received the message then informs the forwarding system 44 of the receipt of this message and afterwards the forwarding system 44 receives the message from the e-mail server 48 (step 202). The forwarding system 44 then parses message 510 and extracts the intended address for the recipient (e.g., quine@luv-npi.com) from the message (step 204). The forwarding service 44 then does a look-up in table 50 for the intended address (e.g., quine@luv-npi.com) to determine if this address has been registered by a subscriber in the forwarding system 44 (step 206). If no, system 44 sends an e-mail message back to the sender 14 informing the sender 14 that the defunct address of the recipient 30 (e.g., quine@luv-npi.com) is not registered with the forwarding system 44 (step 208). If yes, forwarding system 44, sends the e-mail message 510 addressed to the recipients defunct address 54 (e.g., quine@luv-npi.com) to the recipient subscriber's new e-mail address 52 (e.g., quine@docsense.com) as prescribed in the look-up table 50 of the forwarding system 44. Preferably, forwarding system 44 then sends an e-mail to the sender 14 indicating that the message original addressed to a defunct e-mail address has now been properly forwarded.

Thus, a clear advantage of the present invention e-mail forwarding system 44 is that a sender merely forward a rejected e-mail message to the e-mail address (e.g., corrections@emailangel.com) associated with the forwarding system 44 to determine if the previously rejected message can be forwarded to a proper e-mail address. And if it can, the forwarding system automatically forwards the message to an e-mail address as prescribed by the recipient. Thus, a user of system merely has to forward a rejected e-mail message to forwarding system 44 to utilize its forwarding services. Therefore, no internet access is required, only access to an e-mail server is required which is quite advantageous since many e-mail users only have access to an e-mail server and not an internet server, such as staff employees in corporations and home users who utilize free, or inexpensive e-mail services. Furthermore, in contrast to directory services, the system design preserves recipient privacy by not providing the new e-mail address to the sender.

In an alternative embodiment of the present invention, the look-up table of the e-mail forwarding system 44 may preferably have dynamic parameters in which a subscriber of system may have an account including one or more disfavored e-mail addresses that are associated with one or more forwarding e-mail addresses. For example, and with reference to FIG. 6, look-up table 60 is shown having three subscriber accounts 62, 64 and 66. In account 62, a subscriber is shown to have listed three disfavored e-mail addresses (e.g., doug@yahoo.com, doug@hotmail.com and doug@obsolete.com) in association with a single forwarding e-mail address (e.g., doug@current.com). Thus, when a user of system 44 uses it to forward e-mail to anyone of the listed disfavored e-mail addresses (e.g., doug@yahoo.com, doug@hotmail.com and doug@obsolete.com) the system 44 automatically forwards the e-mail to the single prescribed forwarding e-mail address (e.g., doug@current.com) regardless of which one the disfavored e-mail addresses (e.g., doug@yahoo.com, doug@hotmail.com and doug@obsolete.com) the e-mail message was intended for.

With reference to account 64, a subscriber is shown to have listed a single disfavored e-mail address (e.g., doug@obsolete.com) in association with three forwarding e-mail addresses (e.g., doug@work.com, doug@home.com and doug@wireless.com). Now, when a user of system 44 uses it to forward e-mail intended for the listed single disfavored e-mail address (e.g., doug@obsolete.com), the system 44 automatically forwards the e-mail message to each one of the prescribed e-mail addresses (e.g., doug@work.com, doug@home.com and doug@wireless.com).

Referring now to account 66, a subscriber is shown to have listed three disfavored e-mail addresses (e.g., doug@yahoo.com, doug@hotmail.com and doug@obsolete.com) in association with three forwarding e-mail addresses (e.g., doug@work.com, doug@home.com and doug@wireless.com). Thus, when a user of system 44 uses it to forward e-mail to anyone of the listed disfavored e-mail addresses (e.g., doug@yahoo.com, doug@hotmail.com and doug@obsolete.com), the system 44 automatically forwards the e-mail message to each one of the prescribed e-mail addresses (e.g., doug@work.com, doug@home.com and doug@wireless.com).

Of course it is to be appreciated that a subscriber of system 44 may maintain multiple accounts whereby a single subscriber may maintain each of the previous described accounts 62, 64 and 66.

In another embodiment of the present invention, the e-mail forwarding system may be configured to include an archival database of unsuccessful requests for forwarding undeliverable e-mail messages. As was discussed above in reference to FIG. 3, when the e-mail system 44 determines that there is no e-mail forwarding address in its look-up table 60 for a disfavored e-mail address (step 206), a notice is sent to the user indicating the non-inclusion of an e-mail forwarding address and thus the e-mail message was not forwarded (step 208). One probable reason for this situation is that the owner of the disfavored e-mail address never subscribed to e-mail forwarding services of the present invention e-mail forwarding system 44. Thus, even if this owner shortly thereafter subscribes to the e-mail forwarding services of system 44, the owner is never informed of this previous request and may consequently not receive e-mail messages of possible significance to the subscriber.

However, this problem is solved by providing an archival database in the e-mail forwarding system 44, which database preferably stores parameters of unsuccessful requests for forwarding e-mail messages. Such parameters may include any of those contained in the exemplary e-mail message of FIG. 5b as transmitted by a user to the e-mail forwarding system 44 (e.g., To: Dquine@luv-npi.com and ChrisC@PB.com). Alternatively, the archival database may contain all the parameters contained in the (e-mail message of FIG. 5B).

Figure 7:
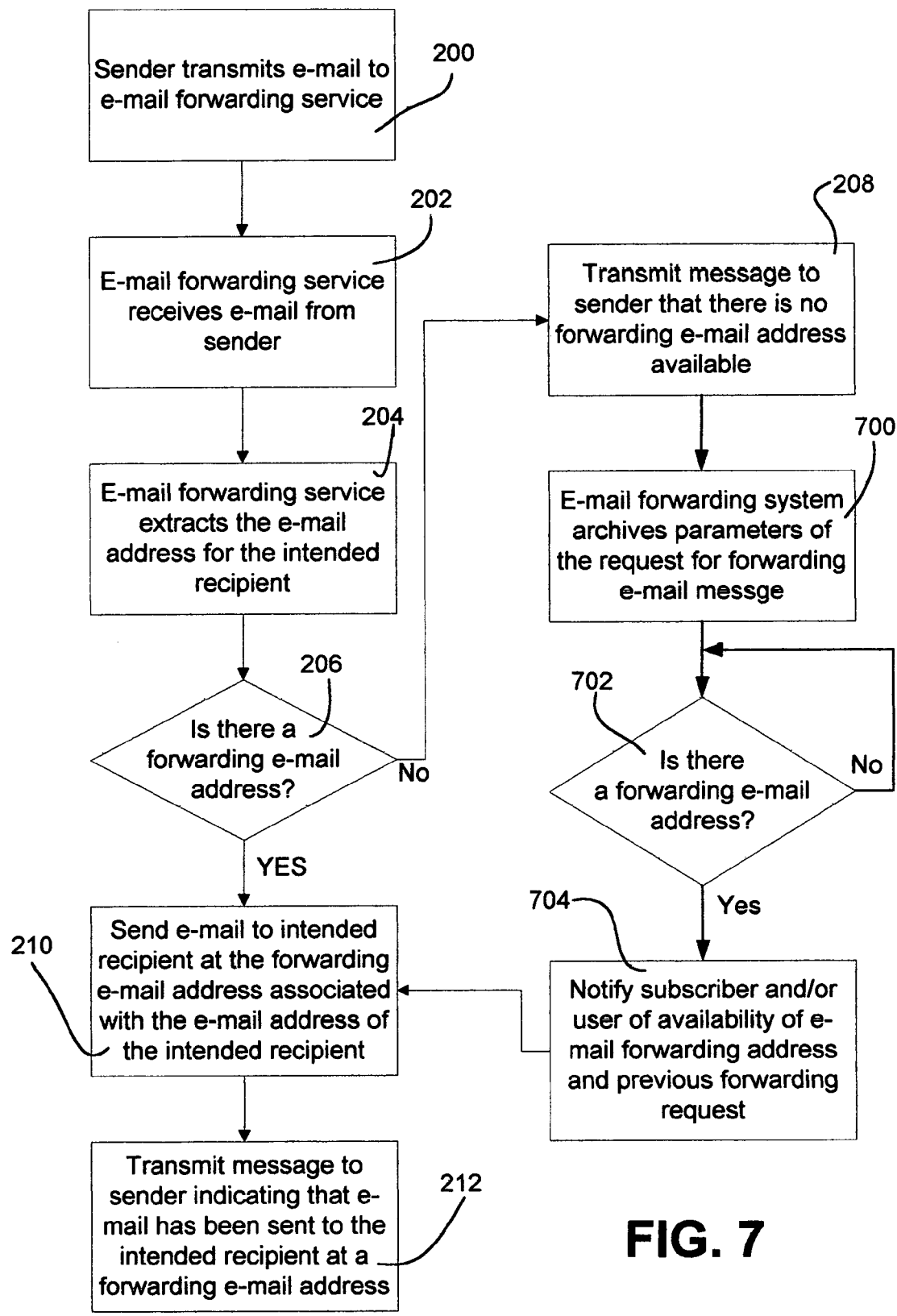
FIG. 7 depicts a flow chart illustrating the steps taken by the present invention e-mail forwarding system for archiving requests for forwarding undeliverable e-mail.

With reference now to FIG. 7, after there has been a determination that there is no forwarding e-mail address (step 208), the e-mail forwarding system 44 archives parameters of the disfavored e-mail message preferably in a database implemented in the e-mail forwarding system 44 (step 700). Next, after each subscriber registers a disfavored e-mail address with system 44, system 44 checks it's aforesaid archival database to determine if there is a match between a newly registered disfavored e-mail address and an archived disfavored e-mail address (step 702). If yes (step 704), system 44 notifies the subscriber that there was already a previous request by a user of the system 44 to forward e-mail to the newly registered disfavored e-mail address. System 44 may preferably notify the subscriber of the requesting user's e-mail address and well the message that was attempted to be forwarded.

Alternatively, if there is such a match, system 44 may notify the requester, via e-mail, that a forwarding e-mail address has now been registered with the system that matches a previous request of the user and the user should once again use the services of system 44 to now successfully forward the e-mail message from a disfavored e-mail address to a forwarding e-mail address. This is advantageous in that only a minimal amount of information needs to be stored in the archival database. Also, it gives the user the option of forwarding a message since a message may become moot after the passage of a certain amount of time and thus the user may not want to forward such a message to the newly registered disfavored e-mail address.

If there is no match for a particular new subscriber, system waits again for a newly disfavored e-mail address to make the determination for a match between a newly registered disfavored e-mail address and those stored in the archival database (step 702).

Alternatively, the system 44 may be configured to make the determination for matches for newly registered disfavored e-mail address[es] and those stored in the archival database after a passage of a prescribed period of time (e.g., every: hour, day, week, month . . . etc.) and thus does not have to make such a determination each time a newly disfavored e-mail address is registered with the system 44.

In summary, an e-mail forwarding system having a dedicated e-mail address for automatically forwarding e-mail has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A method for transmitting an e-mail message comprising the steps of:
   receiving the e-mail message at an intermediate address, the e-mail message including non-preferred e-mail address data, the e-mail message having been previously transmitted to an invalid e-mail address and transmitted back to a sender e-mail address;
   parsing the non-preferred e-mail address data from the e-mail message at the intermediate address and determining whether there is a subscriber account associated with the non-preferred e-mail address and if there is preferred e-mail address data associated with the non-preferred e-mail address data; and
   storing, at a location associated with the intermediate address, the non-preferred e-mail address data and the associated sender e-mail address when it is determined that there is no subscriber account associated with the non-preferred e-mail address and no preferred e-mail address data associated with the non-preferred e-mail address data.

2. The method as recited in claim 1, further comprising the step of: transmitting the e-mail message to the preferred e-mail address when preferred e-mail address data is associated with the non-preferred e-mail address data.

3. The method as recited in claim 2, further comprising the step of sending a return e-mail message to a sender address from the intermediate address indicating that the e-mail message has been sent to the preferred e-mail address.

4. The method as recited in claim 1, further comprising the step of sending a return e-mail message to a sender address from the intermediate address indicating that the e-mail message was not forwarded to the preferred e-mail address.

5. The method as recited in claim 4, further comprising indicating to the sender that the intermediate address will withdraw the e-mail message upon receiving a request from the sender address.

6. The method as recited in claim 1, further comprising the step of transmitting an e-mail message to the preferred e-mail address indicating that a user at a sender e-mail address is attempting to transmit an e-mail message to the non-preferred e-mail address.

7. The method as recited in claim 1, wherein the storing step further comprising the step of: storing the non-preferred e-mail address data until a recipient registers the preferred e-mail address data.

8. A method for transmitting an e-mail message that has been sent from a sender address to a previously-known recipient e-mail address and rejected at the previously-known recipient e-mail address and transmitted back to the sender address, the method comprising the steps of:
   receiving the rejected e-mail message at an intermediate address;
   determining whether there is a subscriber account associated with the non-preferred e-mail address and whether there is a preferred recipient e-mail address from the rejected e-mail message; and
   storing, at a location associated with the intermediate address, the previously-known recipient e-mail address and the associated sender address when it is determined that there is no subscriber account associated with the non-preferred e-mail address and no preferred recipient e-mail address associated with the previously-known recipient e-mail address.

9. The method as recited in claim 8, further comprising the step of:
   transmitting the e-mail message to the preferred recipient e-mail address when a preferred recipient e-mail address is associated with the previously-known recipient e-mail address.

10. The method as recited in claim 8, further comprising the step of sending a return e-mail message to a sender address from the intermediate address indicating that the e-mail message has been sent to the preferred recipient e-mail address.

11. The method as recited in claim 8, further comprising the step of sending a return e-mail message to a sender address from the intermediate address indicating that the e-mail message was not forwarded to the preferred recipient e-mail address.

12. The method as recited in claim 11, further comprising indicating to the sender that the intermediate address will withdraw the e-mail message upon receiving a request from the sender address.

13. The method as claimed in claim 8 further comprising the step of transmitting an e-mail message to the preferred recipient e-mail address indicating that a user at a sender e-mail address is attempting to transmit an e-mail message to the previously-known recipient e-mail address.

14. The method as recited in claim 8, wherein the storing step further comprising the step of: storing the non-preferred e-mail address data until a recipient registers the preferred e-mail address data.

15. A method for transmitting an e-mail message that has been sent from a sender address to a second address, rejected at the second address and transmitted back to the sender address, the e-mail message including a non-preferred e-mail address associated with a first service provider, the method comprising the steps of:
   receiving the e-mail message at an intermediate address;
   parsing the e-mail message to obtain the non-preferred e-mail address from the e-mail message;
   determining whether there is a subscriber account associated with the non-preferred e-mail address and whether there is a preferred e-mail address, that is associated with a second service provider, from the non-preferred e-mail address; and
   storing, at a location associated with the intermediate address, the non-preferred recipient e-mail address when it is determined that there is no subscriber account associated with the non-preferred e-mail address and no preferred recipient e-mail address associated with the non-preferred e-mail address.

* * * * *